Jan. 21, 1930. R. MITCHELL 1,744,488
FASTENER
Filed Feb. 10, 1928
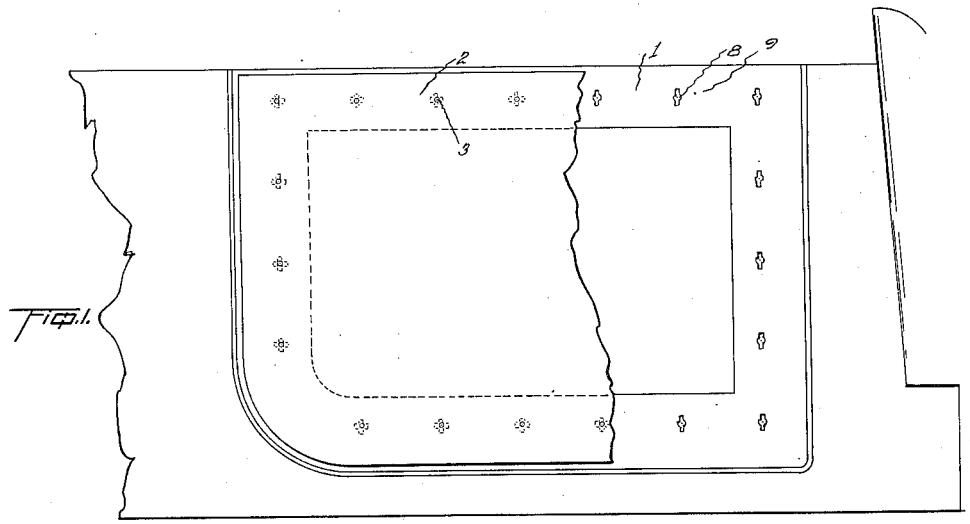
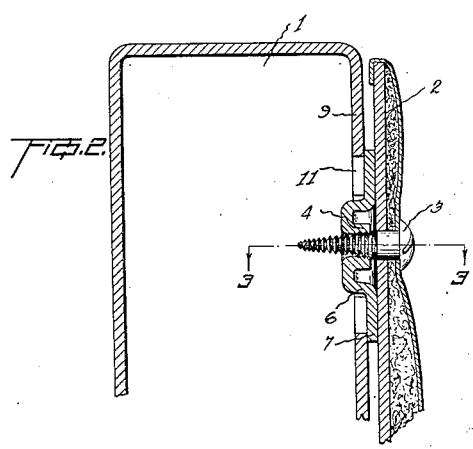
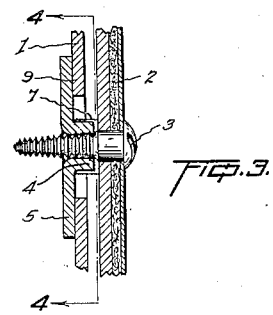
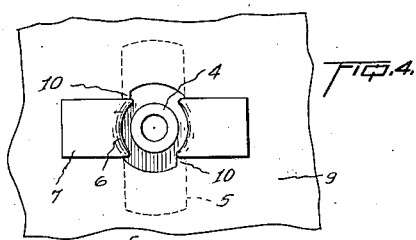
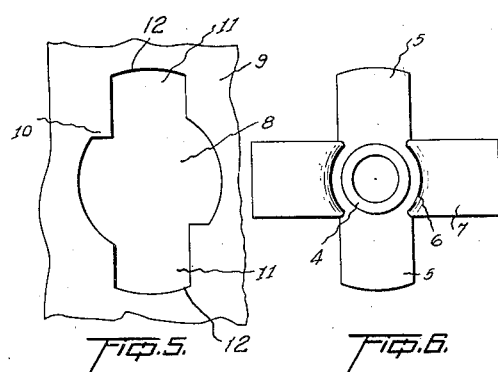
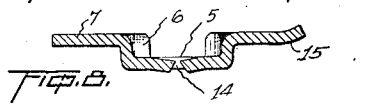
Inventor
Robert Mitchell
By
Attorney Patented Jan. 21, 1930

1,744,488

UNITED STATES PATENT OFFICE

ROBERT MITCHELL, OF DETROIT, MICHIGAN

FASTENER

Application filed February 10, 1928. Serial No. 253,363.

The present invention pertains to a novel fastener and is directed more particularly to a device for use in connection with the attachment of upholstery or finishing pads to the inner wall of an automobile body.

As stated in my co-pending applications Serial No. 88,314 of February 15, 1926, and Serial No. 192,170 of May 18, 1927, it is desired that one of the elements of each fastening device between the body and the pads have a floating support in order to compensate for inaccuracies in alignment. The present invention has for its object to provide such a device wherein the anchoring element for receiving the securing element of the fastener may be inserted in the supporting member or automobile body and held therein in a floating condition. The invention also provides means for limiting the turning movement of this anchoring element in case the securing element is a screw.

The invention is fully disclosed by way of example in the following description and in the accompanying drawing, in which—

Figure 1 is a detail elevation of a pad or finishing panel applied according to the invention;

Fig. 2 is a detail transverse section of the assembly;

Fig. 3 is a detail section on the line 3—3 of Fig. 2;

Fig. 4 is a section on the line 4—4 of Figure 3;

Fig. 5 is an elevation of the supporting member, showing the slot cut therein for receiving the fastener element;

Fig. 6 is a plan view of said element;

Fig. 7 is a plan view of a modified element for receiving a nail or tack; and

Fig. 8 is a transverse section on the line 8—8 of Figure 7.

Reference to these views will now be made by use of like characters which are employed to designate corresponding parts throughout.

The numeral 1 indicates a part of the framework of an automobile to which an upholstery pad 2 is to be applied. Screws 3 are used for making the attachment, and the anchoring member for each screw is separate from the section 1. This anchoring member, in one embodiment, is comprised of an eyelet 4 having a pair of outwardly extending lugs 5 lying in a common plane. Between the members 5 is formed a similar pair of lugs which are bent upwardly from the plane of the members 5 on arcuate shoulders 6 concentric with the eyelet 4 and then outwardly at 7 to occupy a plane spaced from and parallel to that of the members 5. The screw 3 is threaded into the eyelet 4 as clearly shown in Figs. 2 and 3, but the attachment of the fastening element 4—7 to the member 1 will first be described.

For each fastener assembly, a substantially circular opening 8 is formed through the wall 9 of the member 1 to which the pad 2 is to be applied. This opening has a greater radius than the shoulders 6 but retains inwardly projecting corners or stops 10 at diametrically opposite points. In communication with the opening are formed a pair of diametrically opposed slots 11 having the width of one of the pairs of lugs, preferably the lugs 5, and whose outer ends 12 are spaced the distance between the outer ends of said lugs. The slots 11 are so related to the stops 10 that the latter occur at diagonally opposed inner corners of the slots.

In the use of the device, the lugs 5 are slipped through the slots 11, which is permitted by the dimensions already described, so that each pair of lugs lies at a different side of the member 9. The fastening element 4—7 is turned to carry the lugs 5 out of alignment with the slots 11 so that the device will not fall out of the desired position. The pad 2 is now applied by turning the screw 3 into the eyelet 4, and in this operation one of the turned portions 6 of the lugs 7 will be obstructed by an edge of one of the stops 10, so that the fastener element 4—7 will be firmly held to permit driving of the screw 3 therethrough.

Figures 7 and 8 illustrate a modification wherein the eyelet is replaced by intersecting slits 13 and 14 to accommodate a nail or tack in place of a screw for fastening the pad 2. These figures also show one of the lugs 7 somewhat prolonged and bent across one edge at 15. The extension of the lug is such that the total length of the device across the lug 7 slightly exceeds the length of the opening 8 longitudinally of the slots 11. Consequently the anchoring member must be slightly flexed in order to pass through the opening, and the flexion is produced merely by pressure in pushing the element through the opening. After having passed through the opening, the anchoring element assumes its normal position and cannot slip out of the opening.

Although specific embodiments of the invention have been illustrated and described, it will be understood that various alterations in the details of construction may be made without departing from the scope of the invention as indicated by the appended claims.

What I claim is:—

1. A fastener element comprising an anchoring member adapted to receive a securing element and having two pairs of outwardly extending lugs disposed in spaced parallel planes, whereby each pair may be positioned at a different side of a flat supporting member.

2. A fastener element comprising an anchoring member adapted to receive a securing element and having two pairs of outwardly extending lugs disposed in spaced parallel planes, in combination with a supporting member slotted to receive one of said pairs of lugs and to retard the other pair of lugs, whereby each pair of lugs may be disposed at a different side of said supporting member.

3. A fastener element comprising an anchoring member adapted to receive a securing element and having two pairs of outwardly extending lugs disposed in spaced parallel planes, in combination with a supporting member apertured to receive the body of said fastener element and slotted to receive one of said pairs of lugs and to retard the other pair of lugs, whereby each pair of lugs may be disposed at a different side of said supporting member, and stop members extending from said supporting member into the aperture and engageable by the fastener element to limit rotation thereof.

4. A fastener element comprising an anchoring member adapted to receive a securing element and having a pair of lugs extending outwardly therefrom in a common plane, another pair of lugs bent axially from said anchoring element and outwardly in a plane parallel to the first named plane, in combination with a supporting member apertured to receive the body of said fastener element and slotted to receive one of said pairs of lugs and to retard the other pair of lugs, whereby each pair of lugs may be positioned at a different side of the supporting member, and stop members extending from said supporting member into the apertures and engageable by the axially bent portion of the lugs to limit rotation of the fastener element.

5. A fastener element comprising an anchoring member adapted to receive a securing element and having a pair of lugs extending outwardly therefrom in a common plane, another pair of lugs bent axially from said anchoring element and outwardly in a plane parallel to the first named plane, in combination with a supporting member having an aperture of sufficient size to loosely receive the body of said fastener element and having a pair of slots communicating with said aperture and adapted for penetration by one of said pairs of lugs, whereby each pair of lugs may be positioned at a different side of said supporting element.

6. A fastener element comprising an anchoring member adapted to receive a securing element and having a pair of lugs extending outwardly therefrom in a common plane, another pair of lugs bent axially from said anchoring element and outwardly in a plane parallel to the first named plane, in combination with a supporting member having an aperture of sufficient size to loosely receive the body of said fastener element and having a pair of slots communicating with said aperture and adapted for penetration by one of said pairs of lugs, whereby each pair of lugs may be positioned at a different side of said supporting element, and stop members extending from said supporting member into the aperture and engageable by the fastener element to limit rotation thereof.

7. A fastener element comprising an anchoring member adapted to receive a securing element and having two pairs of outwardly extending lugs disposed in spaced parallel planes, in combination with a supporting member slotted to receive one of said pairs of member slotted to receive one of said pairs of lugs and to retard the other pair of lugs, whereby each pair of lugs may be disposed at a different side of said supporting member, one of the lugs receivable in the slot being elongated beyond a perfect fit in the slot and bent so that pressure on the anchoring member and some flexing thereof is required to move it through the slot.

In testimony whereof I affix my signature.

ROBERT MITCHELL.